United States Patent [19]

Pringle

[11] 4,234,120
[45] Nov. 18, 1980

[54] AXLE HOUSING ASSEMBLY

[75] Inventor: William L. Pringle, Grosse Pointe Shores, Mich.

[73] Assignee: United States Steel Corporation, Pittsburgh, Pa.

[21] Appl. No.: 893,895

[22] Filed: Apr. 6, 1978

[51] Int. Cl.³ .................... B23K 31/02; B23Q 3/00; F16H 57/02

[52] U.S. Cl. .................... 228/173 C; 228/173 F; 228/182; 29/463; 74/607

[58] Field of Search .................... 29/463; 74/607; 228/182, 173 R, 173 C; 72/347, 348, 367, 338

[56] References Cited

U.S. PATENT DOCUMENTS

| Re. 18,925 | 8/1933 | Murray, Jr. | 74/607 |
|---|---|---|---|
| 744,310 | 11/1903 | Wallace | 74/607 |
| 1,225,915 | 5/1917 | Zerk | 72/348 |
| 1,254,488 | 1/1918 | Ekern et al. | 74/607 |
| 1,440,658 | 1/1923 | Coapman | 29/463 |
| 1,613,592 | 1/1927 | Smith | 29/463 |
| 1,621,007 | 3/1927 | Ford | 29/463 X |
| 2,153,287 | 4/1939 | Wallace et al. | 29/463 X |
| 2,192,904 | 3/1940 | Ferris | 228/173 F |
| 2,199,502 | 5/1940 | Maddock | 29/463 |
| 2,370,641 | 3/1945 | Dewey | 74/607 |
| 3,673,888 | 4/1972 | Moll et al. | 29/463 |

FOREIGN PATENT DOCUMENTS

| 2833 of 1870 | United Kingdom | 72/347 |
|---|---|---|
| 682193 | 11/1952 United Kingdom | 74/607 |

OTHER PUBLICATIONS

Kasper, How Steels and Dies Interact in Forming Shapes, May 1971, Metal Progress.

Primary Examiner—Samuel Scott
Assistant Examiner—G. Anderson
Attorney, Agent, or Firm—McGlynn and Milton

[57] ABSTRACT

An axle housing assembly including a cup-shaped center housing having flattened portions which are diametrically opposed from each other. Tubular housing members, each having an end face which is circular in cross section, are connected to the flattened portions of the cup-shaped center housing by a friction weld. The tubular housing members include a connecting portion extending axially from the end face, a first frustroconical portion interconnecting an intermediate portion to the connecting portion and a second frustroconical portion extends axially from the intermediate portion. The cross-sectional area of the connecting portion is thicker than the first frustroconical portion which gradually decreases in thickness toward the intermediate portion. The cup-shaped center housing defines a cavity having an opening thereto and includes a flange portion extending inwardly about the periphery of the opening and a cover plate is mounted on the inwardly extending flange portion. A spring seat member having a configuration providing first and second contact areas is welded to the tubular housing member. Additionally, there is disclosed a method of making the above-described axle housing assembly comprising the steps of forming the cup-shaped center housing from a flat plate and forming the flattened portions, forming the tubular housing members, forming openings in the flattened portions and connecting the tubular housing members to the flattened portions so that the tubular members are disposed over the openings.

3 Claims, 6 Drawing Figures

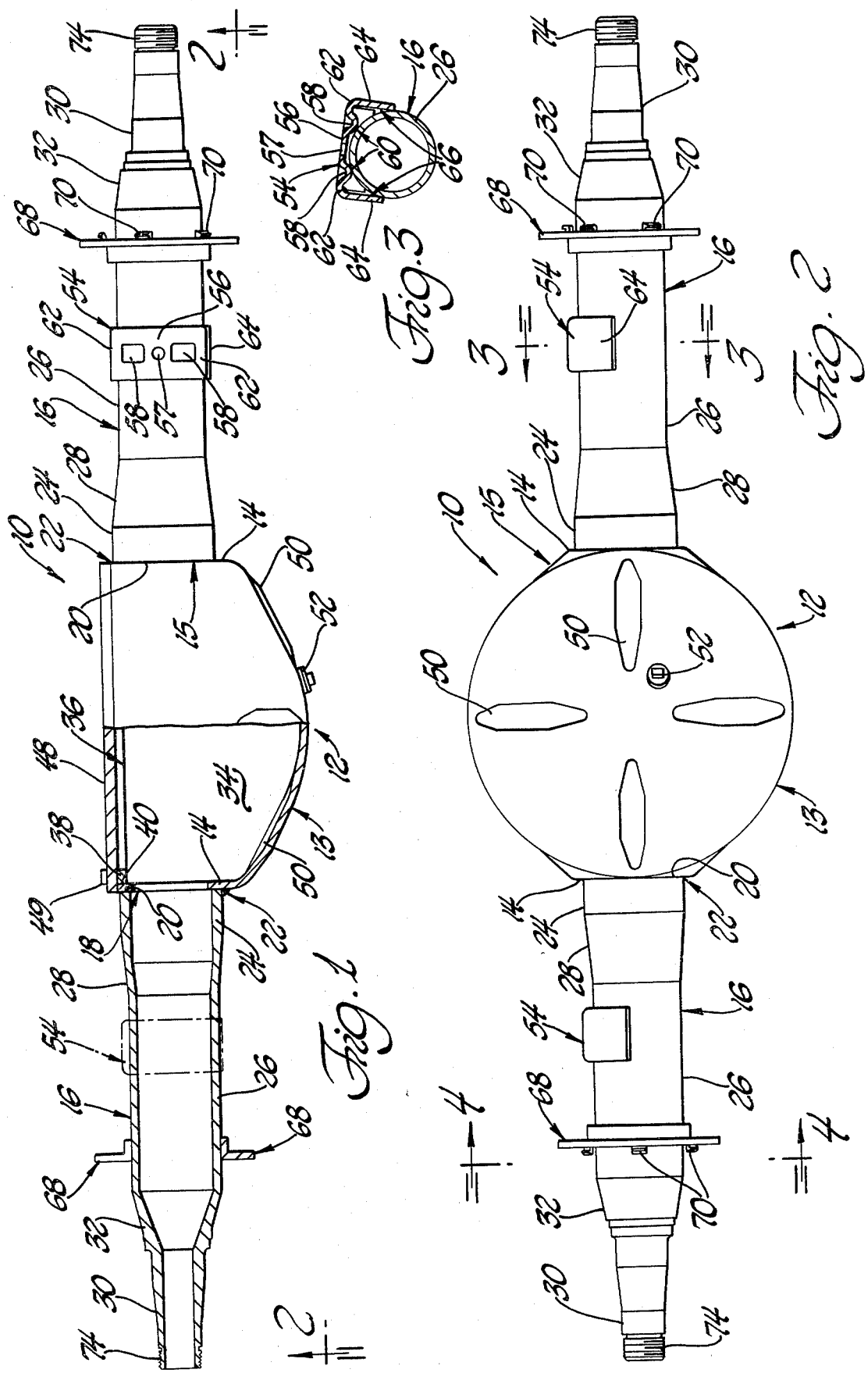

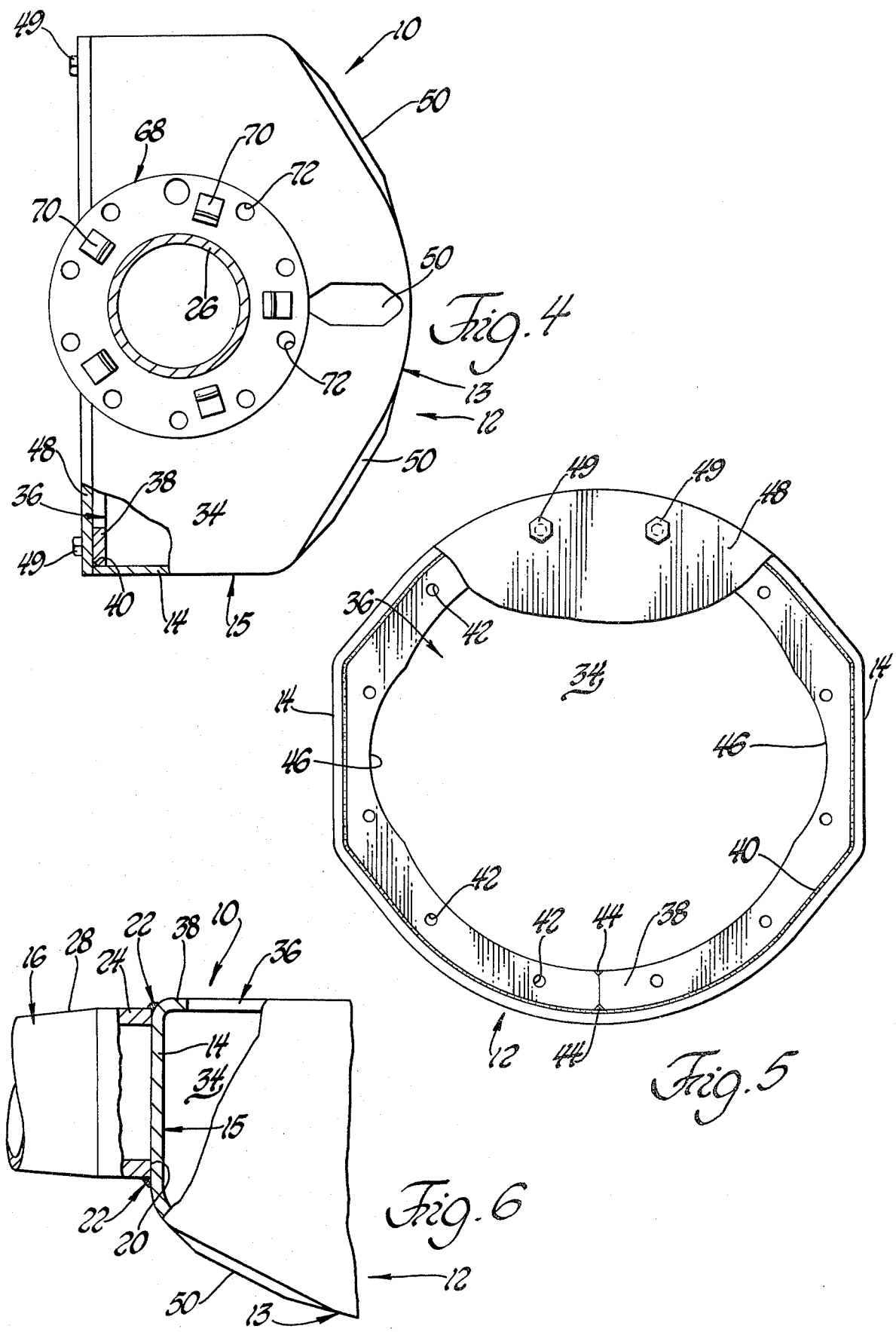

AXLE HOUSING ASSEMBLY

This application is a divisional of application Ser. No. 893,895, filed Apr. 6, 1978.

BACKGROUND OF THE INVENTION (1) Field of the Invention

The subject invention relates to axle housings and, particularly, rear axle housings for vehicles such as trucks, automobiles, busses, tractors and the like. Typical rear axle housings are used to mount and enclose the differential gearing and shafting for driving the rear wheels of a vehicle.

(2) Description of the Prior Art

In the past, axle housings were generally made from big long forgings. As a result, when manufacturing axle housings they were quite long and bulky and difficult to work with, particularly in the case of truck axle housings. In addition, manufacture of these axle housings required many processes, and elaborate and expensive tooling. Thus, it was found to be desirable to provide an axle housing assembly which may be made by parts or components which are connected together. This allows work to be done on the various parts before they are connected in place which allows the axle housings to be easier to work within a smaller area during the manufacturing process. Typically, the prior art axle housings may be made by separate parts and components which are connected together; however, the prior art axle housings are complex in structure and are not economically and easily manufactured.

SUMMARY OF THE INVENTION

The subject invention relates to an axle housing assembly having a cup-shaped center housing with flattened portions diametrically opposed from each other. Tubular housing members are connected to the flattened portions of the cup-shaped center housing by connecting means.

PRIOR ART STATEMENT

Typical of an axle housing assembly of the type to which the instant invention pertains is that shown in U.S. Pat. No. 1,934,854 granted to H. S. Holmes on Nov. 14, 1933. That patent discloses connecting members having one end which are bolted to a central housing while the other end is welded to tube housings. The subject invention is an improvement thereover by eliminating the separate connecting members.

In the same vein, U.S. Pat. Nos. 1,903,088 granted on Mar. 28, 1933 to L. Blackmore, 2,370,641 granted on Mar. 6, 1945 to C. L. Dewey and 3,535,002 granted on Oct. 20, 1970 to A. F. Stamm disclose axle housing assemblies which may be manufactured by making parts or components which are subsequently connected together by welding or the like. None of these patents, however, disclose the use of a cup-shaped center housing.

U.S. Pat. No. 3,269,214 granted Aug. 30, 1966 to W. S. Nagel discloses an axle housing employing a dish-shaped or cup-shaped center housing. That patent, however, employs bowed channel members which define a chamber which is closed by the dish-shaped center housing and additional separate pieces and filler plates. Thus, that patent does not disclose a cup-shaped center housing having diametrically opposed flattened portions which are connected to tubular housing members.

In summary, the prior art does not suggest an axle housing assembly with a combination of components of the subject invention which, in turn, allows the components to be efficiently and economically manufactured and assembled.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a plan view partially broken-away and in cross section of an axle housing assembly constructed in accordance with the instant invention;

FIG. 2 is a side elevational view taken substantially along line 2—2 of FIG. 1;

FIG. 3 is a cross-sectional view taken substantially along line 3—3 of FIG. 2;

FIG. 4 is an elevational view partially broken-away and in cross section illustrating one embodiment of the instant invention and taken substantially along line 4—4 of FIG. 2;

FIG. 5 is an enlarged elevational view illustrating certain details of the instant invention; and FIG. 6 is an enlarged fragmentary view partially broken-away and in cross section illustrating another embodiment of the instant invention.

DESCRIPTION OF THE PREFERRED EMBODIMENT

Referring to FIGS. 1 and 2, an axle housing assembly is generally shown at 10. The assembly 10 includes a cup-shaped center housing generally shown at 12 having flattened portions 14 which are diametrically opposed from each other and are connected with tubular housing members generally indicated at 16.

More specifically, the cup-shaped center housing 12 includes a bottom portion generally indicated at 13 with a cylindrical wall generally indicated at 15 extending about the periphery of the bottom portion 13. The bottom portion 13 is spherical and has a concave configuration as viewed from looking into the cup-shaped center housing 12. The flattened portions 14 are formed on the cylindrical walls 15.

The center housing 12 and the tubular members 16 are used to enclose the differential gearing and shafting which drive the rear wheels of a vehicle. As shown in FIG. 1, a suitable opening generally indicated at 18 allows the center housing 12 and the tubular housing members 16 to communicate with each other.

Referring to FIGS. 1, 2 and 6, each of the tubular housing members 16 have an end face 20 which is circular in cross section and abuts the flattened portion 14. As it will be appreciated, the assembly 10 includes connecting means for connecting the tubular housing members 16 to the flattened portions 14 of the cup-shaped center housing 12. The connecting means includes a friction weld generally indicated at 22 connecting the end face 20 of the tubular housing member 16 to the flattened portion 14 of the cup-shaped center housing 12. The friction weld 22 or spin weld may be formed by rotating the tubular member 16 whereby the end face 20 and flattened portion 14 are engaged in rubbing contact under axial pressure and thereby fuse together.

The tubular housing members 16 include a connecting portion 24 extending axially from the end face 20 and is interconnected to an intermediate portion 26 by a first frustroconical portion 28. Additionally, the tubular housing members 16 also include a terminal end portion 30 which is interconnected to the intermediate portion 26 by a second frustroconical portion 32. As best seen in FIG. 1, the cross-sectional area of the connecting portion 24 which defines the end face 20 is thicker than the first frustroconical portion 28. The first frustroconical portion 28 gradually decreases in thickness toward the intermediate portion 26. In other words, the connecting portion 24, first frustroconical portion 28 and intermediate portion 26 merge with each other in a tapered manner. It is also noted that the intermediate portion 26 is circular and has a constant diameter throughout its length. Additionally, the second frustroconical portion 32 gradually increases in thickness toward the terminal end portion 30.

Referring to FIGS. 1, 4, 5 and 6, the cup-shaped center housing 12 defines a cavity 34 having an opening generally indicated at 36 and includes a flange portion 38 extending inwardly about the periphery of the opening 36. In the embodiment shown in FIGS. 1, 4 and 5, the flange portion 38 is defined by an annular ring welded at 40 to the cup-shaped center housing 12 about the periphery of the opening 36. The annular ring may be formed from identically stamped halves which are welded together at 44. In the embodiment shown in FIG. 6, the flange portion 38 is integral with the cup-shaped center housing 12 and is defined by a portion of the cup-shaped center housing 12 being bent or rolled inwardly. In any event, the flange portion 38 has a plurality of mounting holes 42 therein as shown in FIG. 5.

Still referring to FIG. 5, the flange portion 38 has a circular configuration with diametrically opposed recesses 46 extending toward the flattened portions 14 of the central housing 12. Referring to FIGS. 1, 4 and 5 a cover plate 48 is mounted on the flange portion 38 by bolts 49 which threadedly engage the mounting holes 42. Thus, a gearing differential and shafting is enclosed by the assembly 10. It is also noted that gussets 50 are embossed in the bottom portion 13 of the cup-shaped center housing 12 to provide added strength and support. The gussets 50 extend radially from the center of the bottom portion 13 of the cup-shaped center housing 12. Additionally, a plug 52 is provided in order to allow lubrication of the gearing differential which is enclosed within the assembly 10.

Referring to FIGS. 1, 2 and 3, the assembly 10 includes spring seat members generally indicated at 54 secured to the intermediate portion 26 of the tubular housing member 16. The spring seat members 54 serve to support springs which connect the axle housing assembly 10 to the frame of the vehicle. As best seen in FIG. 3, the spring seat members 54 are comprised of a middle portion 56 which has a spaced relationship to the intermediate portion 26 of the tubular housing member 16. The middle portion 56 has an opening 57 for providing attachment to the springs. Additionally, mounds 58 on each side of the middle portion 56 extend downwardly to first contact areas generally indicated at 60 with the tubular housing member 16. A curved portion 62 extends from the mounds 58 and has legs 64 which project downwardly therefrom and are disposed about the tubular housing member 16 to second contact areas generally indicated at 66 on each side of the tubular housing 16. The spring seat members 54 are welded to the intermediate portion 26 of the tubular housing member 16 at the first and second contact areas 60 and 66, respectively.

Referring to FIGS. 1, 2 and 4, the assembly 10 also includes annular braking flanges generally indicated at 68 having edge bends 70 and a plurality of attachment holes 72 for attachment to a braking structure. The annular braking flanges 68 are disposed about the intermediate portions 26 of the tubular housing members 16 and are fastened thereto by welding or equivalent means.

It is also noted that the terminal end portion 30 of the tubular housing member or sleeve 16 has a threaded end 74 for mounting retainers or the like. As alluded to above, the threads 74 may be machined onto the tubular housing member 16 as well as fastening the spring seat members 54 and annular braking flanges 68 before the tubular members 16 are connected to the cup-shaped center housing 12. In other words, the component parts of the subject assembly 10 may be easily worked on in a small work area and then easily assembled to provide the complete axle housing assembly 10.

Turning now to the steps involved in a method for making the instant axle housing assembly 10, a cup-shaped center housing 12 having a bottom portion 13 with a cylindrical wall 15 extending about the periphery of the bottom portion 13 is formed from a flat plate and flattened portions 14, diametrically opposed from each other, are formed on the cylindrical walls 15 of the cup-shaped center housing 12. The cup-shaped center housing 12 may be drawn or stamped from the flat plate. The method further includes the steps of forming a tubular housing member 16 to include an end face 20 which is circular in cross section, forming a connecting portion 24 extending axially from the end face 20, forming an intermediate portion 26, forming a first frustroconical portion 28 which interconnects the intermediate portion 26 with the connecting portion 24, and forming a second frustroconical portion 32. The tubular housing member 16 may be formed by an extrusion process. More specifically, the method is further defined as forming the tubular housing member 16 with a cross-sectional area of the connecting portion 24 being thicker than the first frustroconical portion 28 and forming the first frustroconical portion 28 with a gradually decreasing thickness toward the intermediate portion 26. The method further includes the step of forming an opening 18 in each of the flattened portions 14. The method also includes the step of connecting the tubular housing member 16 to one of the flattened portions 14 so that the tubular housing member 16 is disposed over the opening 18. The other tubular housing member is connected to the other flattened portion with both of the tubular housing members 16 connected to the flattened portions 14 of the cup-shaped center housing 12 by a friction or spin weld 22 as described earlier. Certain steps of the method may be performed simultaneously or in any one of a variety of logical sequences.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A method for making an axle housing including the steps of; forming a cup-shaped center housing having a bottom portion with a cylindrical wall extending about the periphery of said bottom portion from a flat plate and forming flattened portions diametrically opposed from each other on said cylindrical wall of said cup-shaped center housing, forming an opening in each of said flattened portions, connecting a tubular housing to each of said flattened portions by abutting the ends of the tubular housings against the flattened portions and about the openings therein and welding the tubular housings to the flattened portions.

2. A method as set forth in claim 1 further defined as forming each tubular housing member to include an end face being circular in cross section, forming a connecting portion extending axially from said end face, forming an intermediate portion, forming a first frustroconical portion interconnecting said intermediate portion with said connecting portion, and forming a second frustroconical portion.

3. A method as set forth in claim 2 further defined as forming said tubular housing member with a cross-sectional area of said connecting portion being thicker than said first frustroconical portion and forming said first frustroconical portion with a gradually decreasing thickness toward said intermediate portion.

* * * * *